(12) United States Patent
Mueller et al.

(10) Patent No.: US 7,667,571 B2
(45) Date of Patent: Feb. 23, 2010

(54) LOCKING SYSTEM, IN PARTICULAR FOR A MOTOR VEHICLE

(75) Inventors: Karl Mueller, Rottweil-Neufra (DE); Johannes Mattes, Fridingen (DE); Uwe Hipp, Inzigkofen-Engelwies (DE); Dietmar Weisser, Tuttlingen (DE); Michael Geber, Bad Urach (DE); Markus Ruther, Ostfildern (DE); Andreas Pohlmann, Weil der Stadt (DE); Matthias Reinhardt, Sindelfingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 11/205,795

(22) Filed: Aug. 17, 2005

(65) Prior Publication Data

US 2006/0028353 A1 Feb. 9, 2006

Related U.S. Application Data

(63) Continuation of application No. PCT/EP2004/001475, filed on Feb. 17, 2004.

(30) Foreign Application Priority Data

Feb. 20, 2003 (DE) ............... 103 07 237

(51) Int. Cl.
*G08C 19/00* (2006.01)
(52) U.S. Cl. ............... 340/5.61; 340/5.72; 340/825.69

(58) Field of Classification Search ............... 340/5.64, 340/825.69, 825.72, 10.2, 5.61, 5.66, 5.23, 340/5.22, 5.62, 5.63, 10.1; 455/273, 63.3; 380/262, 274; 713/168; 307/10.5
See application file for complete search history.

(56) References Cited

U.S. PATENT DOCUMENTS

| | | | | |
|---|---|---|---|---|
| 5,412,379 | A | * | 5/1995 | Waraksa et al. ............ 340/5.26 |
| 5,506,905 | A | * | 4/1996 | Markowski et al. ......... 380/262 |
| 5,696,485 | A | * | 12/1997 | Treharne ................... 340/505 |
| 5,699,054 | A | | 12/1997 | Duckworth |
| 5,790,014 | A | * | 8/1998 | Campbell et al. ........ 340/10.34 |
| 5,841,363 | A | | 11/1998 | Jakob et al. |

(Continued)

FOREIGN PATENT DOCUMENTS

DE 43 40 260 A1 4/1995

(Continued)

*Primary Examiner*—Edwin C Holloway, III
(74) *Attorney, Agent, or Firm*—Burr & Brown (57) ABSTRACT

A locking system for providing authorization to access and drive a motor vehicle has a first control device for unlocking and locking the car doors, the ignition lock, the steering wheel lock, etc. Additionally, the locking system has a second device, which is an electronic key or an identifier. The two devices have transmission means and/or receiving means for electromagnetic signals with frequencies v lying in a frequency band between two cut-off frequencies va, vb. At least one of the signals, transmitted between the devices, is a coded operating signal for authenticating the second device. The actual frequency vi with which the transmission means of the second device is operated is stored in a storage means of the first device.

20 Claims, 3 Drawing Sheets

U.S. PATENT DOCUMENTS

| | | | |
|---|---|---|---|
| 5,898,230 A | 4/1999 | Bartel et al. | |
| 6,249,673 B1 * | 6/2001 | Tsui | 455/92 |
| 6,377,173 B1 | 4/2002 | Desai | |
| 6,388,558 B1 | 5/2002 | Emmei | |
| 6,603,388 B1 * | 8/2003 | Perraud et al. | 340/5.61 |
| 6,801,134 B1 * | 10/2004 | Juzswik | 340/825.69 |
| 2002/0190872 A1 * | 12/2002 | Suman et al. | 340/825.69 |
| 2004/0100391 A1 * | 5/2004 | Guthrie | 340/825.69 |

FOREIGN PATENT DOCUMENTS

| | | |
|---|---|---|
| DE | 195 03 756 A1 | 8/1996 |
| DE | 196 45 808 A1 | 5/1998 |
| DE | 198 09 624 C1 | 5/1999 |
| DE | 100 48 338 | 4/2001 |
| DE | 198 22 989 C2 | 6/2002 |
| EP | 0 926 021 A2 | 6/1999 |

* cited by examiner

LOCKING SYSTEM, IN PARTICULAR FOR A MOTOR VEHICLE

CROSS REFERENCE TO RELATED APPLICATIONS

This application is a continuation of International Application No. PCT/EP2004/001475, having an international filing date of Feb. 17, 2004, which designated the United States, the entirety of which is incorporated herein by reference.

This application also claims the benefit of German Application No. 103 07 237.3, filed Feb. 20, 2003, the entirety of which is incorporated herein by reference.

FIELD OF THE INVENTION

The invention relates to a locking system for providing authorization to access and/or drive a motor vehicle.

BACKGROUND OF THE INVENTION

When there are enhanced safety requirements, electronic locking systems which operate by means of electromagnetic waves are used. In particular, in the case of motor vehicles, such locking systems are used as door locking systems for providing access authorization and/or as ignition lock systems, steering wheel locks, immobilizers or the like for providing authorization to drive.

Such locking systems are known from DE 43 40 260 A1. The locking system is composed of a first device which has at least two states and is embodied as a control device for unlocking and/or locking the car doors, the ignition lock or the like, and an associated second device which is embodied in the manner of an electronic key. The two devices have, for their intended mode of operation, transmission means and/or receiving means for electromagnetic signals with frequencies v lying in a frequency band between cut-off frequencies va, vb. In the intended mode of operation, at least one signal for authenticating the key can be transmitted as a coded operating signal between the key and the control device so that after a positive evaluation of the transmitted operating signal, and thus when the key has been authorized, it is possible to bring about a change in the state of the control device.

Such locking systems have also been further developed with what are referred to as "keyless" functionalities. Thus, in the case of the "keyless entry" functionality, manual activation of the electronic key by the user is no longer necessary. It is sufficient for the user to carry the key on his person. The operating signal is then transmitted automatically between the two devices for the access authorization if the user is located in an active range in the vicinity of the motor vehicle and activates, for example, the door handle on the car door there. Likewise, these locking systems can have a "keyless go" functionality, with the operating signal for providing the authorization to drive being transmitted automatically between the two devices for the case when the user is inside the motor vehicle and activates, for example, a start/stop pushbutton key on the dashboard.

In order to transmit signals between the key and the control device, a specific setpoint frequency vs is provided for the respective locking system. However, owing to component tolerances and tolerances in fabrication, in practice deviations from the setpoint frequency vs occur at the transmission means in the two devices. Subsequent adjustment of the two devices to the setpoint frequency vs is complex, associated with high manufacturing costs and increases the rejection rate.

In addition, with the key, in particular a small key with a keyless functionality, adjustment to the setpoint frequency vs is not possible in all cases. For this reason it is necessary for the receiving means in the control device to search through the permissible frequency range [va, vb], specifically to carry out a narrowband search owing to the desired large range for the transmission of signals in order to then set the particular actual frequency vi of the transmission means of the key for the transmission of signals. As a result of this the transmission of signals may take a considerable time so that the locking system is felt to be inconvenient to operate by the user of the motor vehicle.

The time problem becomes even more acute if a plurality of keys, each with different actual frequencies vi, are associated with the same control device. In addition, a plurality of keys may be located in the active range of a motor vehicle, which is equipped with keyless functionalities, and these keys may be associated with the motor vehicle but also with another keyless motor vehicle, which further increases the time required to search through the entire permissible frequency range [va, vb].

SUMMARY OF THE INVENTION

The invention is based on the object of further developing the locking system, which is equipped in particular with a keyless functionality, in such a way that the time required to transmit signals is reduced, in particular with the need for subsequent adjustment to the setpoint frequency vs being eliminated. This object is achieved with a locking system according to the present invention.

With the inventive locking system, the particular actual frequency vi with which the transmission means of the second device is operated is determined. This actual frequency vi is stored in a storage means of the first device. As a result, the actual frequency vi can be selectively set in the second device for the transmission of signals, which eliminates the need to search through the entire permissible frequency range [va, vb].

It is appropriate to determine and store the actual frequency vi of the transmission means in the second device during the initialization process of the locking system, which is performed after the locking system has been installed during the manufacture of the motor vehicle. This then requires only a small amount of time. The determination and storage of the actual frequency vi can even be carried out automatically during the initialization process when the second device is authenticated for the first time.

In order to take into account a subsequent change of the actual frequency vi, which may occur, for example, owing to ageing processes, the actual frequency vi of the transmission means in the second device can be newly determined if required in the manner of a frequency tuning process while the locking system is operating. For the sake of simplicity, the new determination can take place at periodic intervals, for example during the inspection of the motor vehicle, after the expiry of a defined operating period of the motor vehicle or the like. The newly determined actual frequency vi' is then stored in the storage means of the first device instead of the previous actual frequency vi.

As a rule, the user has second and/or replacement keys for the locking system so that a plurality of second devices are associated with a first device. The respective actual frequencies vi of the associated second devices are then expediently determined and stored in the storage means of the first device. The actual frequencies vi can be stored in the form of a table. This eliminates the earlier need to search through the entire frequency range for each of the associated second devices when operating the locking system so that the time taken until the locking system reacts is significantly reduced.

In order to operate the locking system effectively, at the start of the transmission of signals from the second device to the first device the stored actual frequencies vi for the transmission means of the associated second devices are firstly set in succession in the receiving means of the first device. If an associated second device is detected, the transmission of signals is continued with the actual frequency vi which will then have been set in the receiving means of the first device. Only if no associated second device is detected, which may occur, for example, owing to a change in the actual frequency vi which has not yet been taken into account, is the entire frequency band [va, vb] subsequently searched through for an associated second device. As a result, the locking system remains functionally capable even in such an unfavorable case.

A non-volatile memory is suitable as a storage means for storing the actual frequency vi. In order to permit the stored values to be changed later, for example after the actual frequency vi' has been newly determined, the memory is preferably a memory which can be written to. For example an EEPROM or a flash memory are suitable as the memory.

The advantages achieved with the invention are, in particular, the fact that there is no need for either subsequent adjustment of the transmission means in the second device or for the use of particularly precise and thus expensive components. As a result, considerable cost savings for the locking system are achieved. Furthermore, less time is required for the transmission of signals than in the past, which signifies an increase in the convenience for the user of the locking system. Especially with a locking system with a keyless functionality such shortening of the reaction time of the locking system is beneficial for the acceptance of the system by the user.

BRIEF DESCRIPTION OF THE DRAWINGS

An exemplary embodiment of the invention with various developments and refinements is illustrated in the drawings and will be described in more detail below.

DETAILED DESCRIPTION OF THE INVENTION

Figure 1:
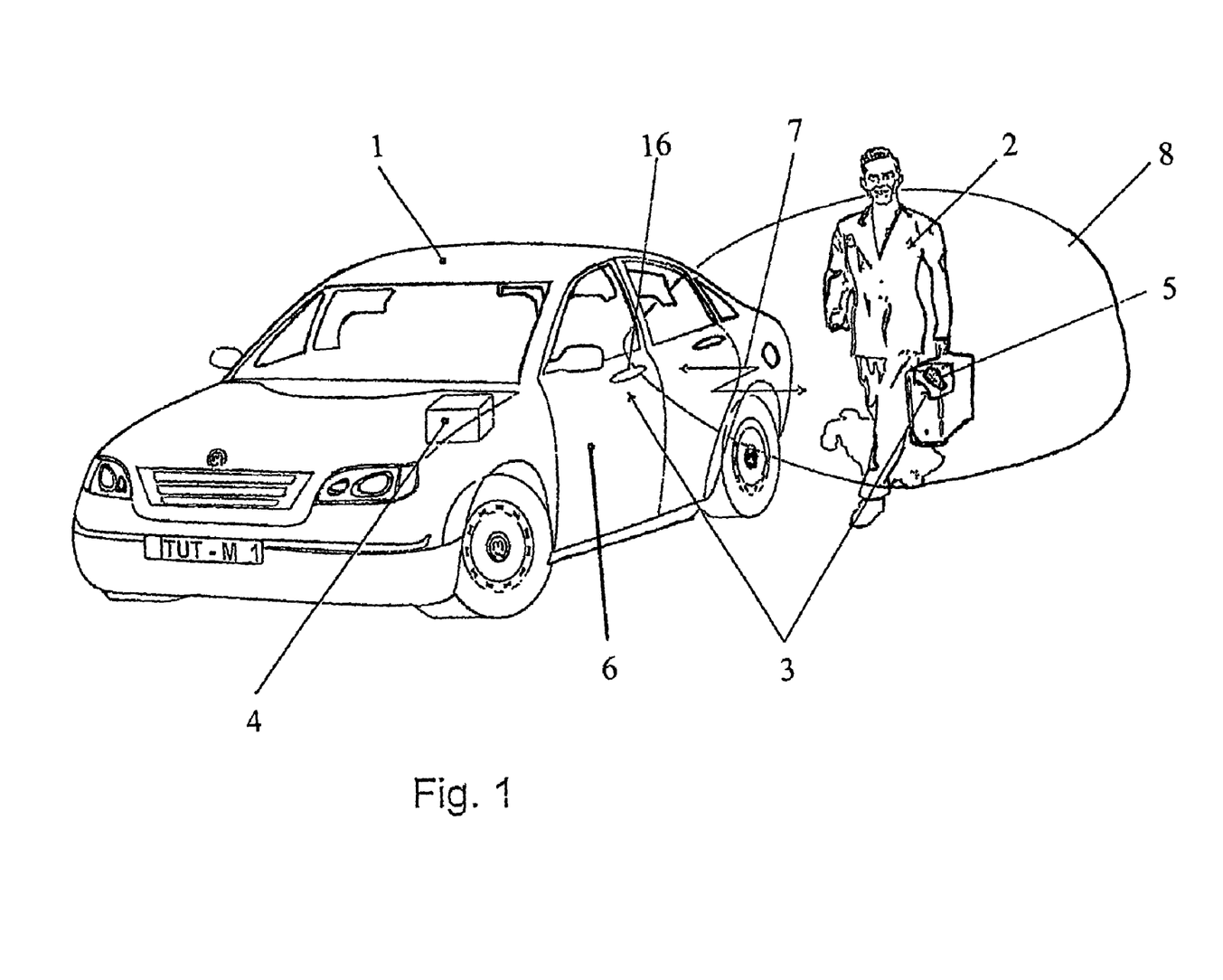
FIG. 1 shows a motor vehicle which is equipped with a locking system.

FIG. 1 shows a motor vehicle 1 with the authorized user 2. The motor vehicle 1 is provided with a locking system 3 as a door locking system for access authorization, the door locking system comprising a first device 4 which is embodied as a control device, and an associated second device 5. The second device 5 is embodied in the manner of an electronic key, an identifier (ID), a chip card, a smart card or the like. The second device 5 is in the possession of the authorized user 2, thus providing him with access to the motor vehicle 1 within an active range 8.

The first device 4 has at least two states, with the car doors 6 being locked in the first state and unlocked in the second state. The two devices 4, 5 have, for their intended mode of operation, transmission means and/or receiving means for electromagnetic signals 7, wherein the transmission and/or receiving means operate with frequencies v lying in a frequency band between two cut-off frequencies va, vb. At least one of these signals 7 which are transmitted between the second device 5 and the first device 4 is a coded, electromagnetic operating signal 15 (see FIG. 3). The coded operating signal 15 serves to authenticate the second device 5, making it possible, to bring about a change in the state of the first device 4 when the second device 5 is authorized after positive evaluation of the transmitted operating signal 15. The coded operating signal 15 is transmitted if the authorized user 2 who is located in the exterior 23 (see FIG. 2) of the motor vehicle 1 activates the door handle 16 on the car door 6 or approaches the door handle 16. As a result, the unlocking of the car doors 6 is triggered in accordance with the keyless entry functionality. The transmission of the coded operating signal 15 can equally well take place automatically without intervention by the user 2 as soon as the user enters the active range 8, but this is not considered in more detail below. If the user closes the car doors 6 from the outside, the car doors 6 are locked automatically. The car doors 6 can equally well be locked automatically after the user has left the active range 8.

The locking system 3 also detects the driving authorization for the motor vehicle 1. For this purpose, the first device 4, which is embodied as a control device, also brings about the unlocking and/or locking of the ignition lock 9 or of the steering wheel lock 10, shown in FIG. 2, in accordance with the two states. Some other functionally relevant component of the motor vehicle 1 can equally well be actuated in a corresponding way by the first device 4. For example, as a result it is possible to enable and/or disable an immobilizer, the engine control device or the like. The coded operating signal 15 for authenticating the second device 5 is transmitted when the authorized user 2 is located in the interior 22 of the motor vehicle 1 and activates the start/stop switch 11. As a result the starting process or the like of the motor vehicle 1 is triggered in accordance with the keyless go functionality.

The method of functioning of the locking system 3 according to the invention will now be explained in more detail with reference to FIG. 3. After the door handle 16 or the start/stop switch 11 has been activated, the first device 4 initially transmits an electromagnetic signal 12 which is referred to as a wake-up signal, for the associated second device 5. As a result, the second device 5 is changed from a state of rest with reduced energy demand into an activated state for the intended mode of operation. Then, the first device 4 transmits at least one further electromagnetic signal 13 which is also referred to below as a range delimitation signal. As a result, the associated second device 5 can determine its location with respect to the first device 4. In particular it is possible to detect whether the second device 5 is located in the exterior 23 of the motor vehicle 1 and, if appropriate, at which location and/or in the interior 22 of the motor vehicle 1. The second device 5 then transmits a further signal 14 which contains the information about the determined location to the first device 4, which is also referred to below as a response signal. Finally, as already described, the coded electromagnetic operating signal 15 for the authentication process is then transmitted between the first and second devices 4, 5. The signal 15 may be composed, in particular, of a plurality of component signals and be transmitted in a bidirectional communication between the two devices 4, 5. For further details on the bidirectional communication per se, reference is made to DE 43 40 260 A1.

Figure 3:
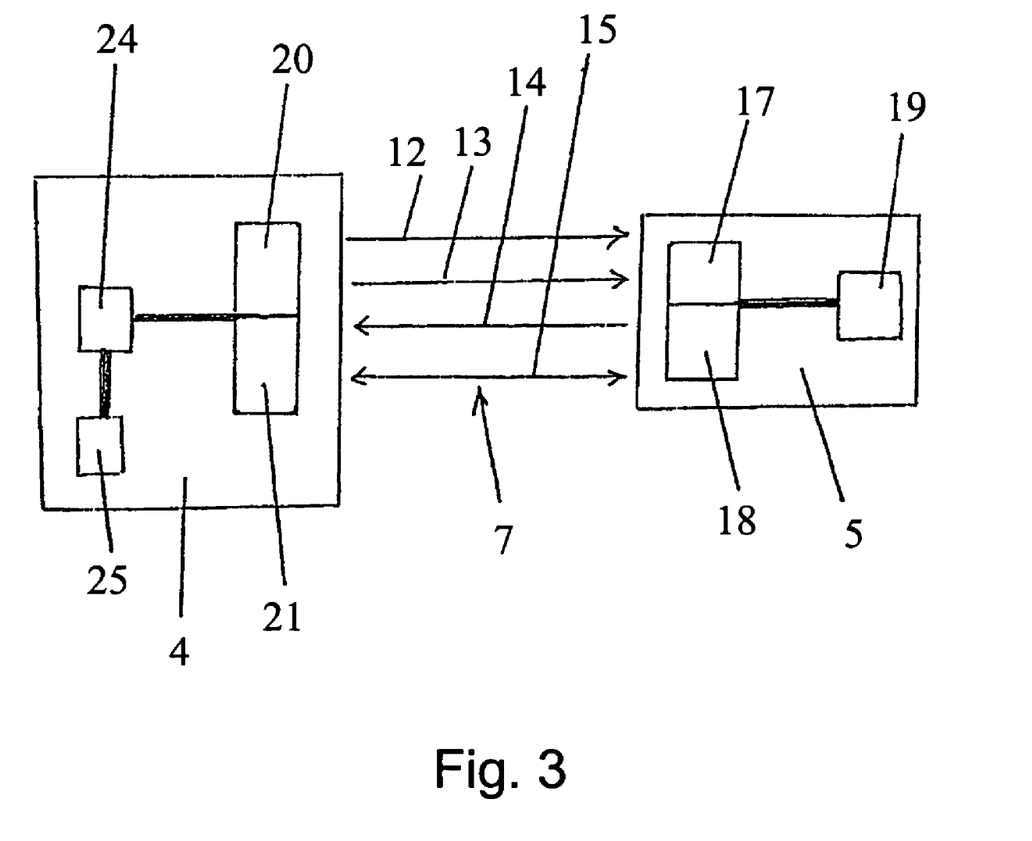
FIG. 3 shows a schematic block circuit diagram of the first and second device with a diagram for transmitting the signals.

The two devices 4, 5 are also shown as a schematic block circuit diagram in FIG. 3. The second device 5 has a transmission means 17 and/or a receiving means 18 for electromagnetic signals as well as a logic circuit 19 which is composed, for example, of a microcomputer. The logic circuit 19 controls the transmission means 17 and receiving means 18 in order to transmit the signals 7 in accordance with the described sequence and carries out their evaluation. The first device 4 also has transmission means 20 and/or receiving means 21 as well as a logic circuit 24, which is composed, for example, of a microcomputer and has the purpose of transmitting and evaluating the signals 7. Furthermore, storage means 25 are arranged in the first device 4. Owing to tolerances in the fabrication, the particular actual frequency vi with which the transmission means 17 of the second device 5 is operated may deviate from the setpoint frequency vs which is desired per se and may lie within the permissible frequency band [va, vb]. According to the invention, the actual frequency vi of the transmission means 17 of the second device 5 is now stored in the storage means 25 of the first device 4. As a result, the actual frequency vi can be set selectively in the receiving means 21 of the first device 4, which eliminates the need to search through the entire frequency band [va, vb]. A non-volatile memory, which can, if appropriate, be written to, for example an EEPROM, a flash memory or the like, is expedient as a storage means 25 for storing the actual frequency vi.

It is appropriate to determine the particular actual frequency vi of the transmission means 17 in the second device 5 when initializing the locking system 3. The initialization during which, inter alia, the coding for the associated first and second devices 4, 5 is defined is carried out after the locking system 3 has been installed in the motor vehicle 1 during its manufacture. During the initialization, the particular actual frequency vi of the transmission means 17 is then stored in the storage means 25. By means of corresponding actuation using the logic circuits 18, 19, the initialization can be carried out automatically when the second device 5 is authenticated for the first time.

During the service life of the motor vehicle 1, ageing processes may occur in the components of the locking system 3 and these may lead to drifting of the particular actual frequency vi of the transmission means 17. In order to take into account such drifting, it is possible for frequency tuning to be subsequently carried out from time to time between the two devices 4, 5. For this purpose, the particular actual frequency vi' of the transmission means 17 in the second device 5 is newly determined while the locking system 3 is operating. The newly determined particular actual frequency vi' is then stored in the storage means 25 of the first device 4 instead of the previous actual frequency vi, for which purpose the storage means 25 is advantageously embodied as a memory which can be written to. The frequency tuning is expediently carried out at periodic intervals. For example, the frequency tuning can be performed when the motor vehicle 1 is inspected, after a defined operating time of the motor vehicle 1 or the like.

Figure 2:
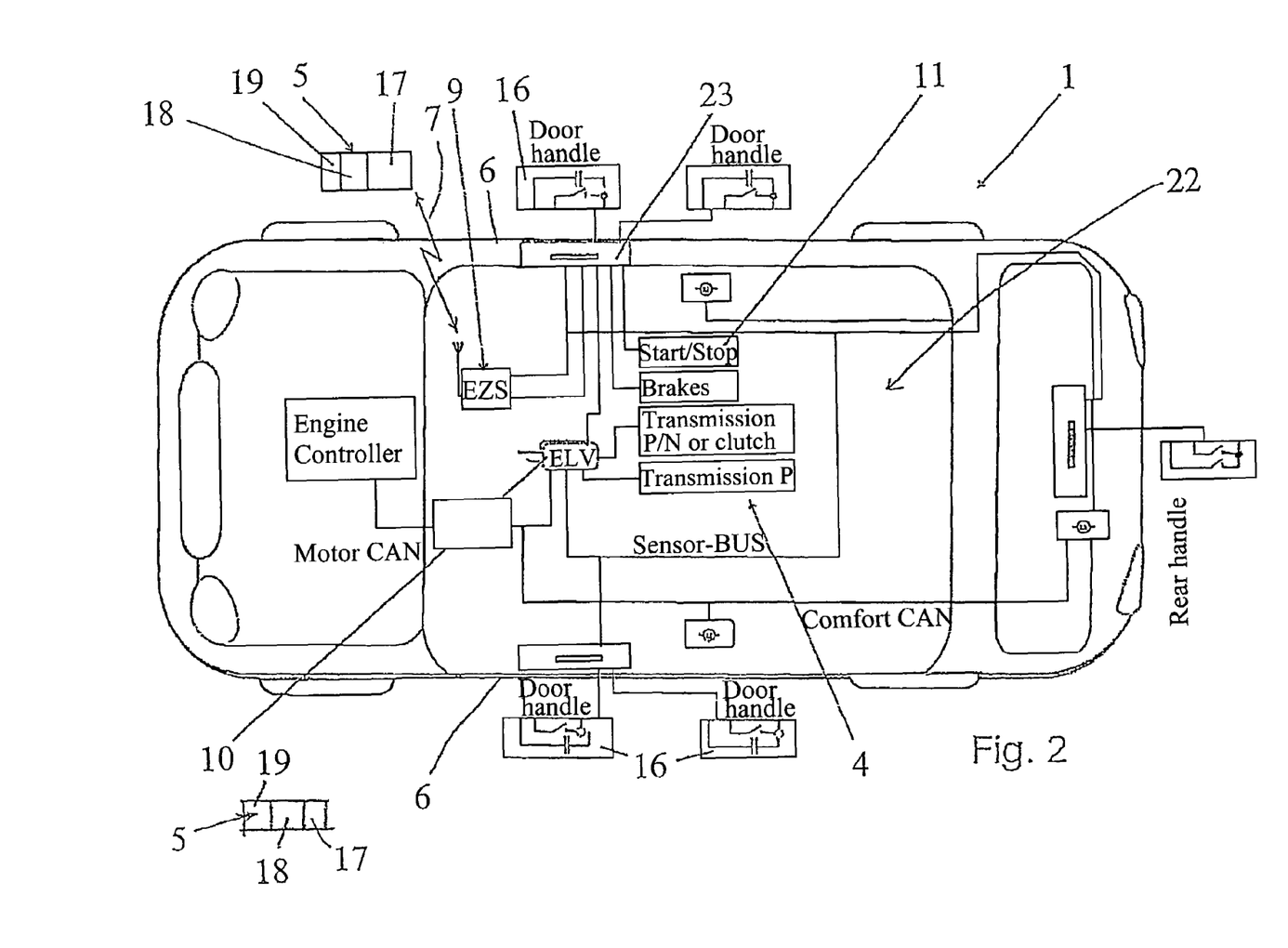
FIG. 2 shows a schematic block circuit diagram for the locking system.

A plurality of second devices 5 may be associated with a first device 4, for example the user 2 may additionally possess an electronic second key and/or spare key 5' which is shown in FIG. 2. The actual frequencies vi of the transmission means 17 of the various second devices 5, 5' will generally differ from one another. For this reason it is advantageous if the particular actual frequency vi of the second device 5' is also stored in the storage means 25 of the first device 4. The respective particular actual frequencies vi of the associated second devices 5, 5' can expediently be stored in the form of a table in the storage means 25 of the first device 4.

The following method of operation is appropriate for the locking system 3 in order to exploit the advantages of the stored actual frequencies vi. When the transmission of signals from the second device 5 to the first device 4 begins, for example when the response signal 14 and/or the operating signal 15 is transmitted, the stored actual frequencies vi for the transmission means 17 of the associated second devices 5, 5' are then firstly set in succession in the receiving means 21 of the first device 4. If an associated second device 5, 5' is detected, the transmission of signals is continued with the actual frequency v1 which will then have been set in the receiving means 21 of the first device 4. If no associated second device 5, 5' is detected, the entire frequency band [va, vb] is then searched through for an associated second device 5, 5'. The last-mentioned case may occur owing to drifting, not yet considered, of the components of the transmission means 17 in the second device 5, when there is a spare key 5' which was subsequently added to the locking system 3, or the like. The functional capability of the locking system 3 is also provided by this measure in the last-mentioned case, albeit with an increased time requirement. However, in such a case it is then appropriate to perform the already described frequency tuning as soon as possible.

The invention is not restricted to the exemplary embodiment described and illustrated. Instead it also comprises all developments by a person skilled in the art within the scope of the patent claims. Such a locking system can thus be used not only in a motor vehicle. Use for any other door lock which is located, for example, on a piece of real estate or the like is also possible.

LIST OF REFERENCE NUMERALS

1: Motor vehicle
2: (authorized) User
3: Locking system
4: First device
5: Second device
6: Car door
7: Signal
8: Active range
9: Ignition lock
10: Steering wheel lock
11: Start/stop switch
12: Signal/wake-up signal
13: Signal/range-delimitation signal
14: Signal/response signal
15: Signal/(coded) operating signal
16: Door handle
17: Transmission means (second device)
18: Receiving means (second device)
19: Logic circuit (second device)
20: Transmission means (first device)
21: Receiving means (first device)
22: Interior (of motor vehicle)
23: Exterior (of motor vehicle)
24: Logic circuit (first device)
25: Storage means

What is claimed:

1. A method for operating a keyless operating system for locking an enclosure, the method comprising the steps of:
providing the enclosure with a first control device capable of receiving electromagnetic signals with frequencies v lying in a frequency band between two cut-off frequencies va, vb;
providing a second device remote from the first control device;
performing an initialization process comprising:
searching and/or determining one frequency vi within the frequency band, on which the second device transmits an electromagnetic signal to the first control device;

receiving the electromagnetic signal transmitted from the second device in the first control device; and storing the one frequency vi for the second device within storage means in the first control device after the electromagnetic signal transmitted at frequency vi is received from the second device;

whereby after completion of the initialization process, when a device attached to the enclosure is activated, the first device transmits a wake up signal to the second device, the wake up signal causes the second device to change from a rest state to an activated state, and after the wake up signal, the first device transmits a range delimitation signal to the second device to determine the location of the second device, and the second device transmits a response signal containing location information and transmits the electromagnetic signal at the frequency vi to the first device, wherein the keyless system only uses the frequency vi within the frequency band to authenticate the second device.

2. The method of claim 1, wherein the step of storing the actual frequency vi of the transmission means in the first device occurs only when the locking system is initialized.

3. The method of claim 1, further comprising the step of determining a new actual frequency vi of the transmission means in the second device at periodic intervals, and storing the newly determined actual frequency vi'in the storage means of the first control device instead of the previous actual frequency vi.

4. The method of claim 1, wherein the second device is a plurality of second devices.

5. The method of claim 4, further comprising the step of searching the entire frequency band between two cut-off frequencies va, vb for an associated second device if no associated second device is detected by receiving only the stored frequencies vi.

6. The method of claim 4, wherein the actual frequencies vi of the plurality of second devices are stored in the storage means of the first control device in the form of a table.

7. The method of claim 1, wherein the storage means for storing the actual frequency vi is a non-volatile memory.

8. The method of claim 1, wherein the enclosure is a motor vehicle.

9. The method of claim 8, wherein the first control device is a control device resident on the motor vehicle for performing at least one function selected from the group consisting of: actuating the door locks, actuating the ignition lock, actuating the steering wheel lock, actuating the immobilizer and actuating an engine control device.

10. The method of claim 8, wherein the second device is in the form of one of an electronic key, an identifier and a chip card.

11. The method of claim 9, wherein the door automatically locks when the second device is outside of an active range from the first device.

12. The method of claim 9, wherein the start/stop switch is only activated when the second device is located within the interior of the enclosure.

13. The method of claim 9, wherein the door automatically locks when the door is shut and the second device is located outside the enclosure.

14. The method of claim 1, wherein the step of determining the actual frequency vi in the second device occurs when the second device is first authenticated.

15. The method of claim 1, wherein the initialization process is only performed during manufacturing or inspection of the enclosure.

16. A method for operating a keyless operating system for performing at least one function of a motor vehicle selected from the group consisting of: actuating door locks of the motor vehicle, actuating a steering wheel lock of the motor vehicle, actuating an immobilizer of the motor vehicle, and actuating an engine control device of the motor vehicle, the method consisting of the steps:

providing the motor vehicle with a first control device;

providing a second device remote from the first device, the second device including a transmitter transmitting a coded operating signal at a frequency vi fixed therein, the frequency vi lying in a frequency band between two cut-off frequencies va, vb;

performing an initialization sequence for the second device, the initializing sequence consisting of (i) instructing the first device to scan the frequencies lying in the frequency band, (ii) instructing the second device to transmit the coded operating signal at the fixed frequency vi, (iii) instructing the first control device to identify the frequency vi of the coded operating signal, and (iv) instructing the first device to save the frequency vi within the first control device;

whereby after completion of the initialization sequence, when a device attached to the motor vehicle is activated, the first device transmits a wake up signal to the second device, the wake up signal causes the second device to change from a rest state to an activated state, and after the wake up signal, the first device transmits a range delimitation signal to the second device to determine the location of the second device, and the second device transmits a response signal containing location information and transmits the electromagnetic signal at the frequency vi to the first device, performing a plurality of operation sequences after the initialization sequence, each operation sequence consisting of (i) instructing the first control device to receive only the frequency vi for the second device saved during the initialization sequence without scanning remaining frequencies lying in the frequency band, (ii) instructing the second device to transmit the coded operating signal at its fixed frequency vi, (iii) authenticating the second device, and (iv) performing the function of the motor vehicle.

17. The method of claim 16, wherein the second device is a plurality of second devices.

18. The method of claim 17, further comprising the step of searching the entire frequency band between two cut-off frequencies va, vb for an associated second device if no associated second device is detected by receiving only the stored frequencies vi.

19. The method of claim 17, wherein the actual frequencies vi of the plurality of second devices are stored in the storage means of the first control device in the form of a table.

20. A method for operating a keyless operating system for locking an enclosure, the method comprising the steps of:

providing the enclosure with a first control device capable of receiving electromagnetic signals with frequencies v lying in a frequency band between two cut-off frequencies va, vb;

providing a second device remote from the first control device; performing an initialization process comprising:

determining one frequency vi within the frequency band, on which the second device transmits an electromagnetic signal to the first control device during the initialization process;

receiving the electromagnetic signal transmitted from the second device in the first control device to authenticate the second device during the initialization process; and storing the one frequency vi for the second device within storage means in the first control device after the electromagnetic signal transmitted at frequency vi is received from the second device only during the initialization process;

whereby after completion of the initialization process, when a user having the second device enters an active communication range of said first device, the first device automatically transmits a range delimitation signal to determine the location of the second device, and the second device transmits a response signal containing location information with respect to the first device, and the second device automatically transmits the electromagnetic signal at the one frequency vi to the first device to at least unlock the enclosure, wherein the first control device of the keyless system initially only searches for the frequency vi within the frequency band to authenticate the second device.

* * * * *

UNITED STATES PATENT AND TRADEMARK OFFICE
CERTIFICATE OF CORRECTION

PATENT NO. : 7,667,571 B2 Page 1 of 1
APPLICATION NO. : 11/205795
DATED : February 23, 2010
INVENTOR(S) : Karl Mueller et al.

It is certified that error appears in the above-identified patent and that said Letters Patent is hereby corrected as shown below:

Column 8

*Line 63*: start a new paragraph after "device;" beginning with "performing"

Signed and Sealed this

First Day of June, 2010

David J. Kappos
*Director of the United States Patent and Trademark Office*